April 18, 1961 R. O. PENCE 2,980,417
OVERLOAD SUPPORT FOR VEHICLES
Filed Nov. 29, 1957
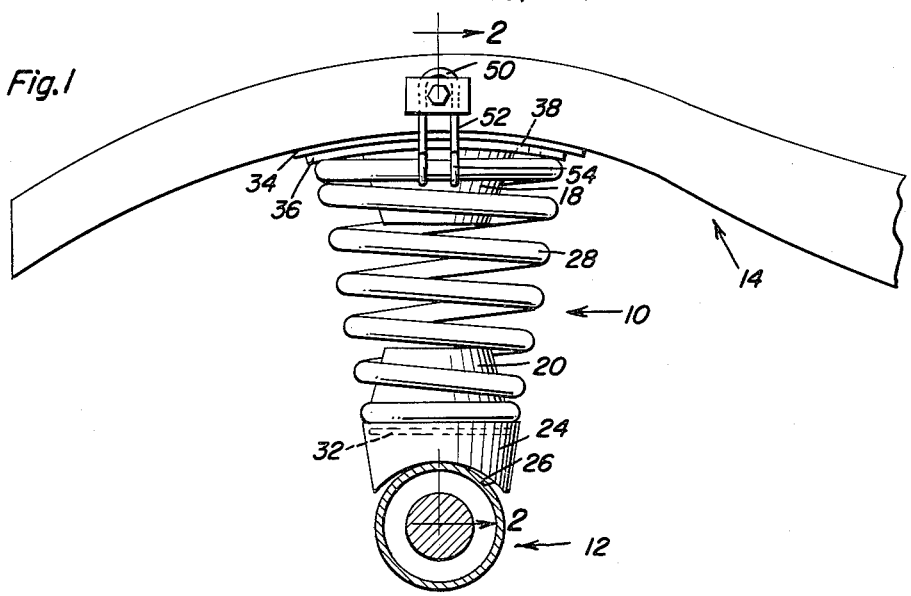
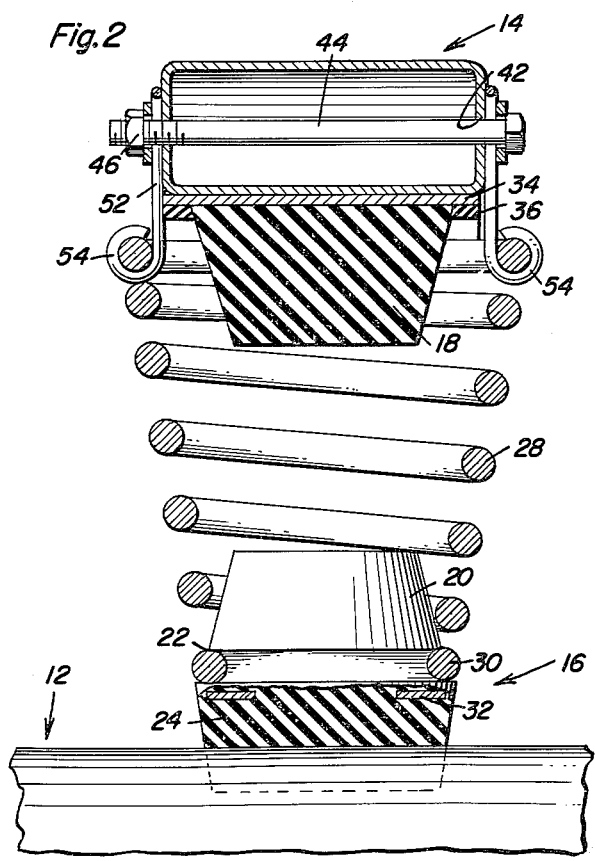
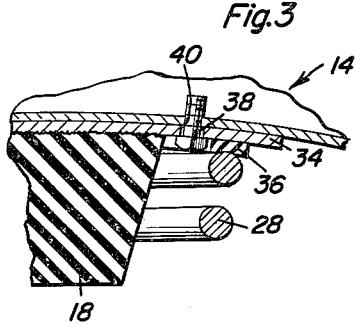
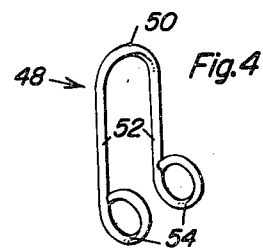
Roscoe O. Pence
INVENTOR.

United States Patent Office 2,980,417
Patented Apr. 18, 1961

2,980,417

OVERLOAD SUPPORT FOR VEHICLES

Roscoe O. Pence, Sterling, Kans.

Filed Nov. 29, 1957, Ser. No. 699,618

8 Claims. (Cl. 267—33)

This invention relates generally to attachments for vehicles, and more particularly to an overload support for vehicles.

The primary object of this invention is to provide an overload support so that upon excessive load in an automobile, or when the vehicle travels over rough terrain, it will provide additional support to the vehicle so as to augment the regular springs of the automobile.

A further object of this invention is to provide an overload support, whereby initially the device is very resilient, and upon further depression of the rear of a vehicle the resiliency becomes less, so that the vehicle will not sag and reach a position which is dangerously close to the ground.

Another object of this invention is to provide an overload support for vehicles, having spaced rubber cones with a spring interposed between, so that the spring may take-up the first portion of a load, and the rubber cones may firmly, but resiliently, support any excessive load thereon.

Still a further object of this invention is to provide a device when there is no metal to metal contact so that noise and squeaking or scratching sounds are virtually eliminated.

An even further object of this invention is to provide a device which will allow the springs of a vehicle to retain the flexibility yet retaining steadiness and firmness so as to give a more level ride when the vehicle is overloaded.

Yet a further object of this invention is to provide a simple and inexpensive device and yet one which is exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the device comprising the present invention, illustrating the same attached to certain elements of a vehicle;

Figure 2 is an enlarged vertical sectional view taken substantially along the plane defined by reference line 2—2 of Figure 1, illustrating details of construction thereof;

Figure 3 is a partial vertical sectional view taken through the device illustrating a method of connecting the upper cone to the vehicle frame assembly; and Figure 4 is a perspective view of the hanger which is used to connect the coil spring to the vehicle frame.

Referring now more specifically to the drawings, the numeral 10 generally designates the overload support comprising the present invention, which would be interposed between a vehicle axle 12 and the vehicle frame member 14.

The overload support 10 is constructed of a bottom rubber cone 16, and an upper rubber cone 18, both cones being tapered inwardly and toward each other. The lower cone 16 comprises a cone portion 20, a seat 22 formed at the lower end thereof and concentrically therebout, and a base 24. The base 24 has a circular notch 26 formed in the bottom thereof so as to accommodate axle 12.

An upwardly and outwardly tapered coil spring 28 has its lower coil 30 engaged in seat 22. The upper end of coil spring 28 is disposed about upper rubber cone 18. A metal reinforcing washer 32 is embedded into base 24 and the lower cone 16, and the outer edge of washer 32 is disposed outwardly of the center line of lower coil 30, so that the corner of rubber between base 24 and seat 22 will not be sheared away by the force of coil spring 28. Thus, this reinforcing washer 32 serves to preserve the shape of and strengthen base 24.

Upper cone 18 is affixed to a mounting plate 34 by any suitable means such as by cementing. A resilient washer 36, is disposed between mounting plate 34 and the upper coil of spring 28, so that there will be no metal to metal contact, and thus noise caused thereby will be prevented. A bolt 38 is passed through mounting plate 34, and ultimately into frame member 14 where it is secured in a threaded bore 40.

A horizontal opening 42 is formed through frame member 14, and a bolt 44 is passed therethrough and locked therein by a nut 46. Hangers 48 are disposed about bolt 44 and exteriorly of the frame. These hangers comprise a bight portion 50, legs 52 and loops 54 formed at the free ends thereof. Bight portions 50 of the hangers are disposed about bolts 44 with the loops 54 projecting downwardly therefrom. The upper coil of coil spring 28 is disposed through loops 54, so that the upper end of the coil spring is firmly affixed to the frame member 14.

In use, when an excessive load is placed on the vehicle, the spring 28 will be compressed until the cones 18 and 20 contact each other. Then, upon an increased load the resiliency of the cones will allow the vehicle to still be resiliently mounted, while giving a firmness and steadiness thereto. Also, the sagging of the vehicle to a dangerously low point will be prevented thereby.

It may now be seen that I have shown and described a new and improved type of overload support for vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An overload support for vehicles comprising an upper rubber truncated cone, a lower rubber truncated cone, a coil spring disposed between said cones, said cones being tapered inwardly toward each other, means for connecting said upper cone to a vehicle frame member, the lower surface of said lower cone being provided with a concave notch adapted to seatingly receive the upper surfaces of a tubular axle housing and properly position the lower cone with respect to the axle housing upon movement of the vehicle frame downward toward the axle housing, a seat in said lower cone accommodating the lowermost coil of said spring, means for fixedly securing at least the uppermost coil of said spring to the vehicle frame member.

2. An overload support for vehicles comprising an upper rubber truncated cone, a lower rubber truncated cone, a coil spring disposed between said cones, said cones being tapered inwardly toward each other, means for connecting said upper cone to a vehicle frame member the lower surface of said lower cone being provided with a concave notch adapted to seatingly receive the upper surfaces of a tubular axle housing and properly position the lower cone with respect to the axle housing upon movement of the vehicle frame downward toward the axle housing, a seat in said lower cone accommodating the lowermost coil of said spring, means for fixedly securing at least the uppermost coil of said spring to the vehicle frame member, cushioning means interposed between said spring and said vehicle frame for eliminating noise.

3. An overload support for vehicles comprising an upper rubber truncated cone, a lower rubber truncated cone, a coil spring disposed between said cones, said cones being tapered inwardly toward each other, means for connecting said upper cone to a vehicle frame member, the lower surface of said lower cone being provided with a concave notch adapted to seatingly receive the upper surfaces of a tubular axle housing and properly position the lower cone with respect to the axle housing upon movement of the vehicle frame downward toward the axle housing, a seat in said lower cone accommodating the lowermost coil of said spring, means for fixedly securing at least the uppermost coil of said spring to the vehicle frame member, a reinforcing member embedded in said lower cone under said seat a slight distance beneath the surface of said lower cone whereby the force of said spring on said seat will be distributed more evenly throughout said lower cone, said reinforcing member extending outwardly beyond the center line of said lowermost coil whereby the edges of said lower cone outwardly of said lowermost core will not be sheared away by the force of said spring bearing down upon said lower cone.

4. An overload support for vehicles comprising an upper rubber truncated cone, a lower rubber truncated cone, a coil spring disposed between said cones, said cones being tapered inwardly toward each other, means for connecting said upper cone to a vehicle frame member, the lower surface of said lower cone being provided with a concave notch adapted to seatingly receive the upper surfaces of a tubular axle housing and properly position the lower cone with respect to the axle housing upon movement of the vehicle frame downward toward the axle housing, a seat in said lower cone accommodating the lowermost coil of said spring, means for fixedly securing at least the uppermost coil of said spring to the vehicle frame member, a washer embedded in said lower cone under said seat, the outer edge of said washer being disposed outwardly from the center line of the bottom coil of said spring.

5. An overload support for vehicles comprising an upper rubber truncated cone, a lower rubber truncated cone, a coil spring disposed between said cones, said cones being tapered inwardly toward each other, means for connecting said upper cone to a vehicle frame member, the lower surface of said lower cone being provided with a concave notch adapted to seatingly receive the upper surfaces of a tubular axle housing and properly position the lower cone with respect to the axle housing upon movement of the vehicle frame downward toward the axle housing, a seat in said lower cone accommodating the lowermost coil of said spring, means for fixedly securing at least the uppermost coil of said spring to the vehicle frame member, said securing means comprising at least one pair of hangers with a hanger of each pair mounted on opposite sides of said frame member with said hangers engaging at least the uppermost coil of said spring in diametric relation.

6. The combination of claim 5 wherein said hangers comprise two vertically extending legs, a bight portion connecting said legs at the upper ends thereof, loops formed in the lower ends of said legs, means securing said bight portion to said frame member, said loops encircling at least the uppermost coil of said spring.

7. The combination of claim 6 including a horizontal opening formed through said frame member, wherein said last mentioned means comprises a bolt extending through said opening, the ends of said bolt passing between the arms of each hanger, said hangers being disposed exteriorly of said frame member, a nut threadingly engaged with one end of said bolt thereby locking said bolt within said opening and securing said hangers to said frame member.

8. An overload support for vehicles comprising an upper truncated cone, a resilient lower truncated cone, a coil spring disposed between said cones, said cones being tapered inwardly toward each other, means for connecting said upper cone to a vehicle frame, the lower surface of said lower cone being provided with a concave notch adapted to seatingly receive the upper surfaces of a tubular axle housing and properly position the lower cone with respect to the axle housing upon movement of the vehicle frame downward toward the axle housing, said truncated cone comprising a bumper for engagement with said axle and said concave notch adapted to comprise the sole direct engagement of said overload support with said axle.

References Cited in the file of this patent

UNITED STATES PATENTS

| | | |
|---|---|---|
| 199,945 | Vose | Feb. 5, 1878 |
| 214,329 | Vose | Apr. 15, 1879 |
| 347,281 | Vose | Aug. 10, 1886 |
| 1,338,854 | Clark | May 4, 1920 |
| 1,937,854 | Stratton | Dec. 5, 1933 |
| 2,352,446 | Pointer | June 27, 1944 |
| 2,788,987 | Lewis | Apr. 16, 1957 |

FOREIGN PATENTS

| | | |
|---|---|---|
| 497,317 | France | Sept. 9, 1919 |